(12) United States Patent
Zhu et al.

(10) Patent No.: US 8,503,472 B2
(45) Date of Patent: Aug. 6, 2013

(54) PARTIAL BANDWIDTH REQUEST TECHNIQUES IN WIRELESS NETWORKS

(75) Inventors: Jing Zhu, Hillsboro, OR (US); Rath Vannithamby, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 307 days.

(21) Appl. No.: 12/660,231

(22) Filed: Feb. 23, 2010

(65) Prior Publication Data

US 2011/0205974 A1    Aug. 25, 2011

(51) Int. Cl.
*H04L 12/54*    (2006.01)

(52) U.S. Cl.
USPC .......................................................... 370/429

(58) Field of Classification Search
USPC ................. 370/229–231, 310, 328–329, 351, 370/389, 392, 412, 428–429, 235–236.2, 370/241, 252; 455/403, 422.1, 39, 500, 507, 455/509, 434, 450–452.2, 455, 130, 230, 455/266
See application file for complete search history.

(56) References Cited

U.S. PATENT DOCUMENTS

| | | | | |
|---|---|---|---|---|
| 5,533,115 | A  * | 7/1996 | Hollenbach et al. | ..... 379/221.11 |
| 2004/0170243 | A1 * | 9/2004 | Old | .............................. 375/372 |
| 2004/0228296 | A1 * | 11/2004 | Lenzini et al. | ................ 370/322 |
| 2006/0126660 | A1 * | 6/2006 | Denney et al. | ................ 370/468 |
| 2007/0047553 | A1 * | 3/2007 | Matusz et al. | ........... 370/395.42 |
| 2007/0076604 | A1 * | 4/2007 | Litwack | ........................ 370/230 |
| 2007/0223928 | A1 * | 9/2007 | Farmer et al. | ................. 398/116 |
| 2010/0008242 | A1 * | 1/2010 | Schein | .......................... 370/252 |
| 2010/0128739 | A1 * | 5/2010 | Jung et al. | ..................... 370/458 |
| 2010/0322329 | A1 * | 12/2010 | Yoo et al. | ...................... 375/260 |
| 2011/0205993 | A1 * | 8/2011 | Cho et al. | ...................... 370/329 |

OTHER PUBLICATIONS

Niyato, D. and Hossain, E., "Queue-aware uplink bandwidth allocation for polling services in 802.16 broadband wireless networks", Dec. 2005, Global Telecommunications Conference, 2005. GLOBECOM '05. IEEE, pp. 3702-3706.*

* cited by examiner

*Primary Examiner* — Omar Ghowrwal
(74) *Attorney, Agent, or Firm* — Thorpe North & Western, LLP

(57) ABSTRACT

An embodiment of the present invention provides a method of requesting bandwidth allocation in a wireless network, comprising using a partial bandwidth request by a mobile station (MS) operable in the wireless network to a base station (BS) operable in the wireless network, wherein the partial bandwidth request requests bandwidth for only a portion of all packets in an uplink (UL) queue.

19 Claims, 2 Drawing Sheets

PARTIAL BANDWIDTH REQUEST TECHNIQUES IN WIRELESS NETWORKS

BACKGROUND

In a wireless networks, such as wireless wide area network (WWAN), such as WiMAX, LTE, etc., a Mobile Station (MS) needs to request bandwidth from a BS (Base Station) before it can transmit packets stored in its uplink (UL) queue. In the bandwidth request message, an MS indicates the number of bytes a BS should allocate, also called grant size. There are two ways to request bandwidth: contention and piggyback. The contention method is less reliable and has larger delay variation, because multiple MSs may contend at the same time and the bandwidth request message may be lost due to collision. The piggyback method allows an MS to send a bandwidth request message with the data transmission that has been allocated by a BS to the individual MS. It is much more efficient than the contention method.

In both cases, the MS usually sets the grant size of the bandwidth request message to the total number of bytes in the uplink (UL) queue so that it can transmit all the packets as soon as possible. However, if a packet arrives in the future when the queue is empty, the MS can only use the less efficient contention method.

Thus, a strong need exists for partial bandwidth request techniques in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
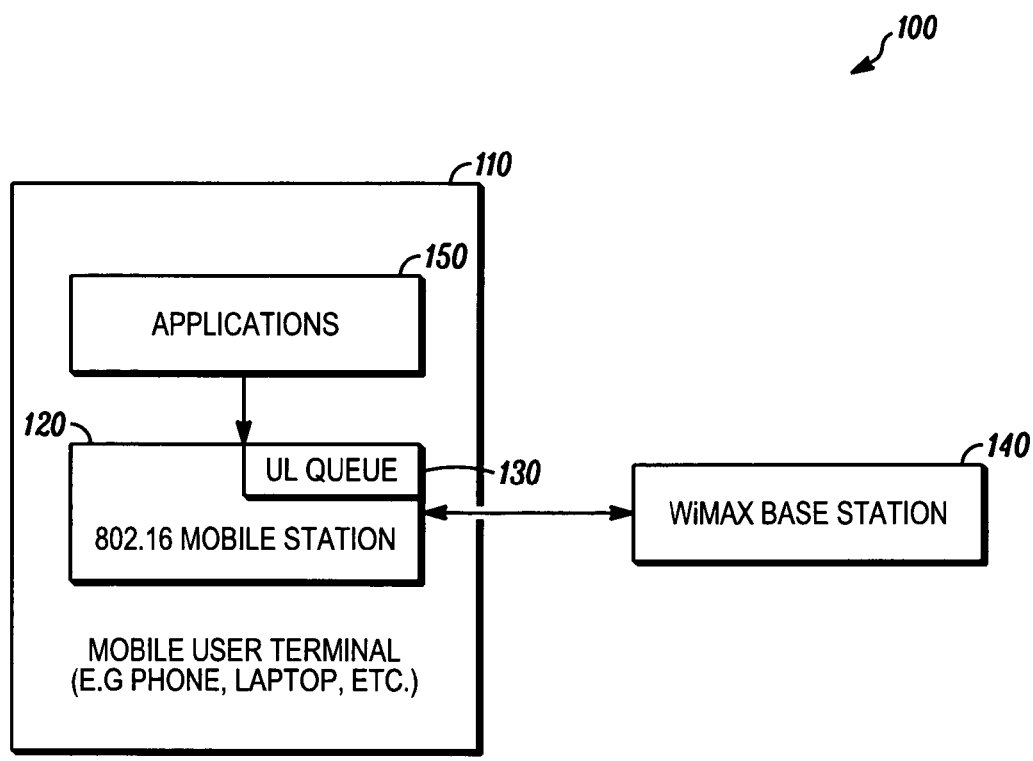
FIG. 1 depicts a system diagram according to an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Embodiments of the present invention provide a method and algorithm that configures the grant size in a Bandwidth Request message appropriately to ensure only portion of the packets in the queue is transmitted each time until only one packet is left in the queue. Embodiments of the present invention further provide a new method to increase the use of piggyback, and reduce delay variation, referred to herein as a Partial Bandwidth Request (P-BWR). In an embodiment of the present invention, a bandwidth request may be for less than all the packets in the UL queue, such as only a portion of them. As a result, the chance of having a data transmission while a new packet is arriving increases, so that the piggyback method can be used as much as possible to minimize delay variation. Furthermore, the P-BWR method reduces the size of each allocation and therefore improves reliability and reduces scheduling delay. Embodiments of the present invention may further provide inserting a gap between packets to smooth out traffic and reduce jitter.

Looking at the figures, FIG. 1 at 100 provides a system diagram, in which an 802.16 MS 120 and applications 150 are collocated in a mobile user terminal 110, such as, but not limited to mobile phone, laptop, PDA etc. The application generates traffic, and they are stored in the UL queue 130 of the MS 120, waiting for allocations scheduled by the BS 140. The MS 120 uses either piggyback or contention to request bandwidth for these packets.

Figure 2:
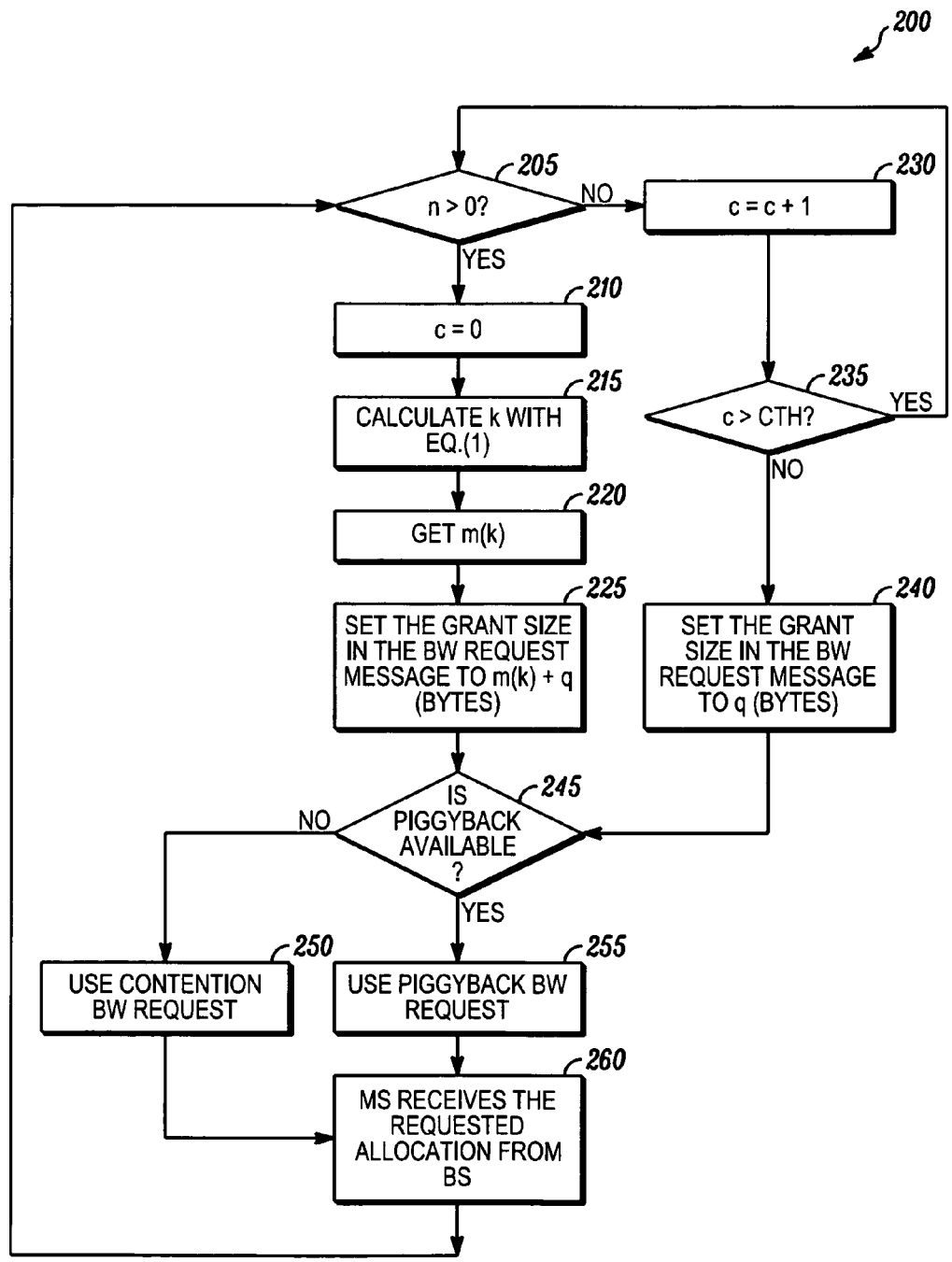
FIG. 2 shows the flow chart of the proposed P-BWR algorithm according to embodiments of the present invention.

FIG. 2, generally shown as 200, shows the flow chart of the proposed P-BWR algorithm with the following parameters:

S: grant size in the bandwidth request message;
n: number of packets in the UL queue;
m(k): the total number of bytes for the first k packets in the UL queue;
c: counter of fake bandwidth requests;
Cth: the maximum number of fake bandwidth requests;
q: number of bytes for sending a bandwidth request message.

K is then calculated as follows:

$$k = \begin{cases} 1, & n = 1 \\ \dfrac{n}{2}, & n \geq 1 \end{cases}$$

It is understood that this is but one way to calculate k, and it is possible to calculate k in other ways. The algorithm starts with checking the status of UL queue 205. It will reset the counter c 210 if the queue is not empty, i.e. n>0, and then calculates 215 the number of packets that should be transmitted together, as indicated by k, and the total number of bytes of the first k packets in the UL queue, as indicated by m(k) 220. After that, the MS will generate the bandwidth request message with the grant size field set to m(k)+q 225, and send it out with the piggyback method 255 if possible, as determined at 245, or the contention method 250. After the MS receives the grant to transmit the packets 260, the algorithm will go back to the state of checking the status of UL queue 205.

If the queue is empty, the MS will add one to the counter c 230. If c does not exceed the threshold Cth 235, the MS will send a fake bandwidth request with the grant size field set to q 240. It is called "fake", because the requested allocation cannot be used to send any bytes in the UL queue, but only a bandwidth request message. The threshold Cth can be used to control how many fake bandwidth requests are allowed for each effective bandwidth request. The process then continues to 245 to determine if piggyback available.

Further embodiments of the present invention provide a computer readable medium encoded with computer executable instructions, which when accessed, cause a machine to perform operations comprising using a partial bandwidth request by a mobile station (MS) operable in said wireless network to a base station (BS) operable in said wireless network, wherein said partial bandwidth request requests bandwidth for only a portion of all packets in an uplink (UL) queue.

It is noted that in an embodiment of the present invention, there may be a queue management process not shown in the figure to remove the packets that have been successfully transmitted from the UL queue, and also add the packets that have newly arrived from the application into the UL queue.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. A method of requesting bandwidth allocation for a mobile station (MS) in a wireless network, comprising:
    using a partial bandwidth request by the MS operable in said wireless network to a base station (BS) operable in said wireless network, wherein said partial bandwidth request requests bandwidth allocation for the MS for only a portion of all packets stored in an uplink (UL) queue of the MS;
    applying a piggyback method that allows the MS to send the partial bandwidth request message with a data transmission that has been allocated by the BS to the MS when a piggyback transmission is available and a contention method to send the partial bandwidth request when a piggyback transmission is not available; and,
    waiting a period of time at the MS before making an additional bandwidth request for at least one remaining portion of said packets stored in said UL queue of the MS, wherein waiting the period of time insures multiple bandwidth grants to increase a likelihood of applying the piggyback method.

2. The method of claim 1, further comprising selecting at least one grant size for said partial bandwidth request to create an improved potential for having a data transmission by the MS while a new packet is arriving at the MS by affecting how many bandwidth requests need to be made.

3. The method of claim 1, wherein said MS sets a grant size of said bandwidth request to a total number of bytes in said UL queue so that it can transmit all the packets as soon as possible.

4. The method of claim 1, further comprising inserting a gap between packets to smooth out traffic and reduce jitter.

5. The method of claim 1, further comprising incorporating queue management to remove packets that have been successfully transmitted from said UL queue and also add packets that have newly arrived from an application into said UL queue.

6. The method of claim 1, wherein said wireless network is a network conforming to the Institute for Electrical and Electronic Engineers (IEEE) 802.16 standard.

7. A mobile user terminal, comprising:
    a mobile station (MS) with a transceiver adapted for communication with a base station (BS) in a wireless network, said transceiver further adapted to:
    request bandwidth allocation for the MS in said wireless network by using a partial bandwidth request to said BS, wherein said partial bandwidth request requests bandwidth for only a portion of all packets stored in an uplink (UL) queue of the MS;
    apply a piggyback method that allows the MS to send the partial bandwidth request message with a data transmission that has been allocated by the BS to the MS when a piggyback transmission is available and a contention method to send the partial bandwidth request when a piggyback transmission is not available; and
    wait a period of time at the MS before making an additional bandwidth request for at least one remaining portion of said packets stored in said UL queue of the MS in order to insure multiple bandwidth grants that increase a likelihood of applying the piggyback method.

8. The MS of claim 7, wherein the MS selects at least one grant size for said partial bandwidth request to create an improved potential for having a data transmission by the MS while a new packet is arriving at the MS by affecting how many bandwidth requests need to be made.

9. The MS of claim 7, wherein said MS sets a grant size of said bandwidth request to a total number of bytes in said UL queue so that it can transmit all the packets as soon as possible.

10. The MS of claim 7, further comprising said MS inserting a gap between packets to smooth out traffic and reduce jitter.

11. The MS of claim 7, further comprising incorporating queue management to remove packets that have been successfully transmitted from said UL queue and also add packets that have newly arrived from an application into said UL queue.

12. The MS of claim 7, wherein said wireless network is a network conforming to the Institute for Electrical and Electronic Engineers (IEEE) 802.16 standard.

13. The mobile user terminal of claim 7, wherein the mobile user terminal is a mobile phone, laptop, or PDA.

14. A non-transitory computer readable medium encoded with computer executable instructions, which when accessed, cause a machine to perform operations comprising:
    using a partial bandwidth request by a mobile station (MS) operable in said wireless network to a base station (BS) operable in said wireless network, wherein said partial bandwidth request requests bandwidth for the MS for only a portion of all packets stored in an uplink (UL) queue of the MS;
    applying a piggyback method that allows the MS to send the partial bandwidth request message with a data transmission that has been allocated by the BS to the MS when a piggyback transmission is available and a contention method to send the partial bandwidth request when a piggyback transmission is not available; and
    waiting a period of time at the MS before making an additional bandwidth request for at least one remaining portion of said packets stored in said UL queue of the MS, wherein waiting the period of time insures multiple bandwidth grants that increases a likelihood of applying the piggyback method.

15. The computer readable medium encoded with computer executable instructions of claim 14, further comprising further instructions that select at least one grant size for said partial bandwidth request to create an improved potential for having a data transmission by the MS while a new packet is arriving at the MS by affecting how many bandwidth requests need to be made.

16. The computer readable medium encoded with computer executable instructions of claim 14, wherein said MS sets a grant size of said bandwidth request to a total number of bytes in said UL queue so that it can transmit all the packets as soon as possible.

17. The computer readable medium encoded with computer executable instructions of claim 14, further comprising further instructions which cause a machine to perform further operations comprising inserting a gap between packets to smooth out traffic and reduce jitter.

18. The computer readable medium encoded with computer executable instructions of claim 14, further comprising further instructions which cause a machine to perform further operations comprising, incorporating queue management to remove packets that have been successfully transmitted from said UL queue and also add packets that have newly arrived from an application into said UL queue.

19. The computer readable medium encoded with computer executable instructions of claim 14, wherein said wireless network is a network conforming to the Institute for Electrical and Electronic Engineers (IEEE) 802.16 standard.

* * * * *